United States Patent  
Rotimi-Fadipe et al.

(10) Patent No.: US 12,482,013 B2
(45) Date of Patent: Nov. 25, 2025

(54) SYSTEM AND METHOD FOR GENERATING AND UPDATING A USER PROFILE FOR AN INSTITUTION BASED ON PEER GROUP DATA

(71) Applicant: Royal Bank of Canada, Toronto (CA)

(72) Inventors: Obakemi Rotimi-Fadipe, Toronto (CA); Vibhav Dindyal, Waterloo (CA); Hung Phi Phillip Truong, Niagara Falls (CA); Wei Liu, Hamilton (CA); Hannah McIsaac, Toronto (CA); Victor Cheng, Toronto (CA); Timothy Dean McGaugh, Toronto (CA)

(73) Assignee: Royal Bank of Canada, Toronto (CA)

(*) Notice: Subject to any disclaimer, the term of this patent is extended or adjusted under 35 U.S.C. 154(b) by 187 days.

(21) Appl. No.: 17/890,845

(22) Filed: Aug. 18, 2022

(65) Prior Publication Data

US 2023/0062714 A1    Mar. 2, 2023

Related U.S. Application Data

(60) Provisional application No. 63/237,666, filed on Aug. 27, 2021.

(51) Int. Cl.
*G06Q 30/0204* (2023.01)
*G06Q 10/0635* (2023.01)
*G06Q 10/107* (2023.01)

(52) U.S. Cl.
CPC ..... *G06Q 30/0204* (2013.01); *G06Q 10/0635* (2013.01); *G06Q 10/107* (2013.01)

(58) Field of Classification Search
CPC ............ G06Q 10/0635; G06Q 10/107; G06Q 30/0204
See application file for complete search history.

(56) References Cited

U.S. PATENT DOCUMENTS

| 11,341,549 B1* | 5/2022 | Srinivasan ......... G06Q 30/0605 |
| 2020/0118155 A1* | 4/2020 | Bloy .................. G06Q 30/0215 |
| 2021/0064663 A1* | 3/2021 | Lillie ..................... G06Q 10/10 |

OTHER PUBLICATIONS

Cocheo, Steve, "Money Freaks Gen Z Out, Creating Opportunity for Financial Marketers", The Financial Brand, Feb. 12, 2019 retrieved on Aug. 19, 2022 at <https://thefinancialbrand.com/79600/generation-z-financial-literacy/>.

* cited by examiner

*Primary Examiner* — Charles Guiliano

(57) ABSTRACT

A method for generating a user profile based on a comparison to peer group data, the user being a member of an institution, the method comprising the steps of: obtaining user profile data pertaining to a user of a network service of the institution; accessing group profile data associated with the user; comparing the user profile data to the group profile data to generate comparative data; generating a user profile for presentation on a user interface, the user profile including the comparative data; sending the user profile to the user; receiving a request from the user for a product of institution; and updating the user profile to include information pertaining to the product.

20 Claims, 10 Drawing Sheets

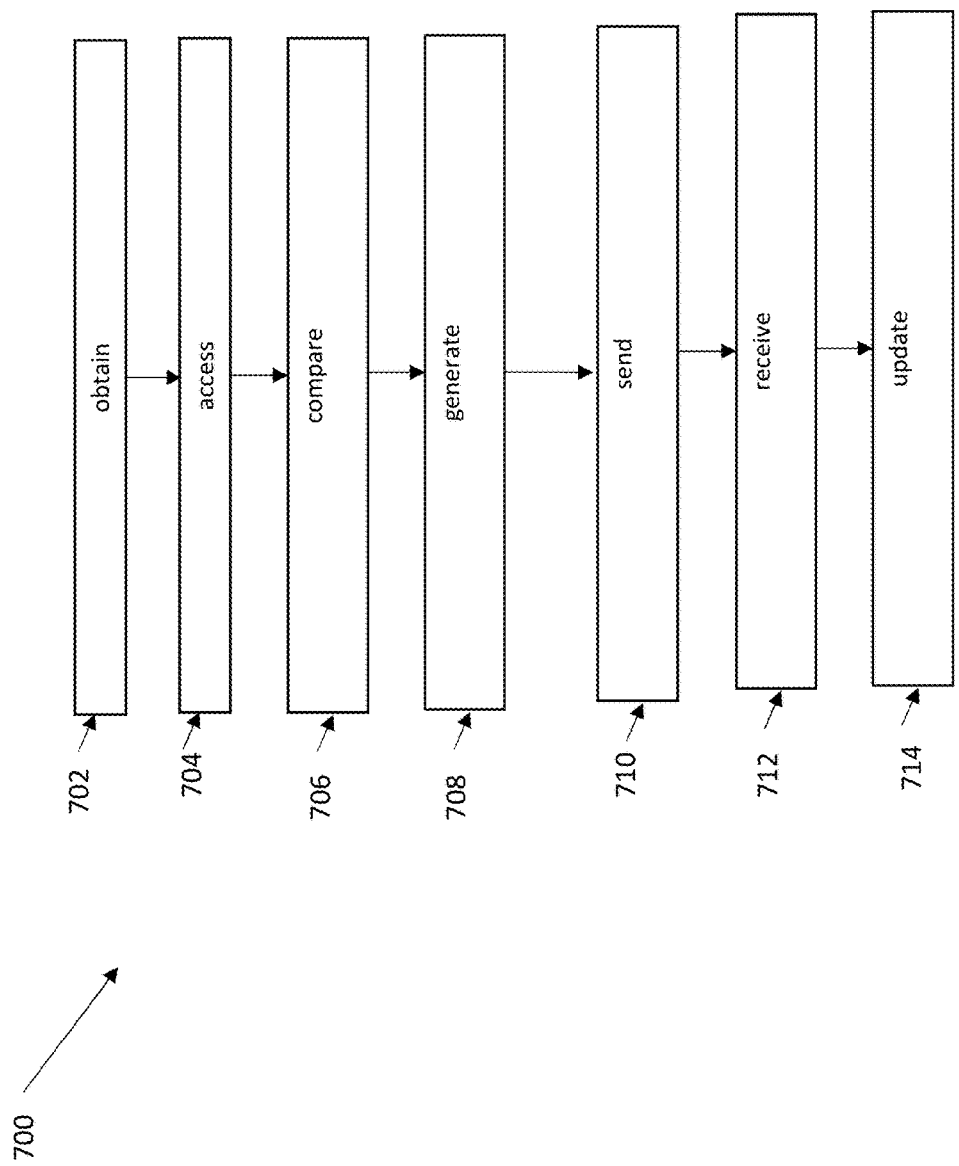

SYSTEM AND METHOD FOR GENERATING AND UPDATING A USER PROFILE FOR AN INSTITUTION BASED ON PEER GROUP DATA

CROSS-REFERENCE TO RELATED APPLICATION

This application claims priority from the benefit of the filing date of U.S. Provisional Patent Application No. 63/237,666 filed on Aug. 27, 2021, entitled "SYSTEM AND METHOD FOR GENERATING AND UPDATING A USER PROFILE FOR AN INSTITUTION BASED ON PEER GROUP DATA", the contents of which are herein incorporated by reference.

TECHNICAL FIELD

The present disclosure is directed at methods, systems, and techniques for maintaining user profiles with an institution.

BACKGROUND

In today's evolving financial landscape, financial literacy has become increasingly important, especially for young people. Unfortunately, financial literacy is often considered boring, irrelevant, and non-relatable for people in their day to day lives. When people do seek out information, they are often met with other problems including financial content being served on the internet that is inaccurate, impersonal, distributed and difficult to find. As with any content on the internet, there is a risk and concern of trustworthiness.

Further, according to the American Psychological Association (https://thefinancialbrand.com/79600/generation-z-financial-literacy/), four out of five consumers ages 18-21 identify money matters as a leading source of stress. Also, those consumers born between 1996 and 2016, (approximately 2.5 billion) are now considered the largest generation in the world globally. This user group also is considered to be network influenced and to spend 12% more time than anyone else rating & reviewing experiences.

As such, what is needed is a network service that facilitates a select user group to achieve their personal goals (e.g. financial).

SUMMARY

An object of the present invention is to provide a system and/or method of generating and updating a user profile to obviate or mitigate at least one of the above-presented disadvantages of the state of the art.

Some young-adult user groups feel unprepared with managing personal finances, and identify money as one of the biggest stressors they face. These user groups are very network driven and share parts of their lives through various forms of social media. They care about what others are doing and how they compare to others e.g. fitness competition with friends on their smart watch, or checking in to share their whereabouts on social platforms. The provided service and associated application facilitated over a computer network can provide a finance solution that aligns with the network-driven & influencer-driven nature of the user group. Further, a user-to-peer comparison can help provide context to (e.g. financial) advice. Instead of generic advice that may not be relevant for a particular individual, given unique income, lifestyle, and expense profiles, there is opportunity to provide more relevant education with peer comparisons. Visibility to how similar people are managing their money can spark curiosity and provide educate on the institutional options (e.g. financial) available to the user.

According to a first aspect, there is provided a method for generating a user profile based on a comparison to peer group data, the user being a member of an institution, the method comprising the steps of: obtaining user profile data pertaining to a user of a network service of the institution; accessing group profile data associated with the user; comparing the user profile data to the group profile data to generate comparative data; generating a user profile for presentation on a user interface, the user profile including the comparative data; sending the user profile to the user; receiving a request from the user for a product of institution; and updating the user profile to include information pertaining to the product.

A further aspect provided is a system for generating a user profile based on a comparison to peer group data, the user being a member of an institution, the system comprising stored instructions for execution by a computer processor for: obtaining user profile data pertaining to a user of a network service of the institution; accessing group profile data associated with the user; comparing the user profile data to the group profile data to generate comparative data; generating a user profile for presentation on a user interface, the user profile including the comparative data; sending the user profile to the user; receiving a request from the user for a product of the institution; and updating contents of the user profile to include information pertaining to the product.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 10 is an example operation of the system of FIG. 1.

DETAILED DESCRIPTION

In at least some embodiments herein, methods, systems, and techniques for generating and updating a user profile 101.

Figure 1:
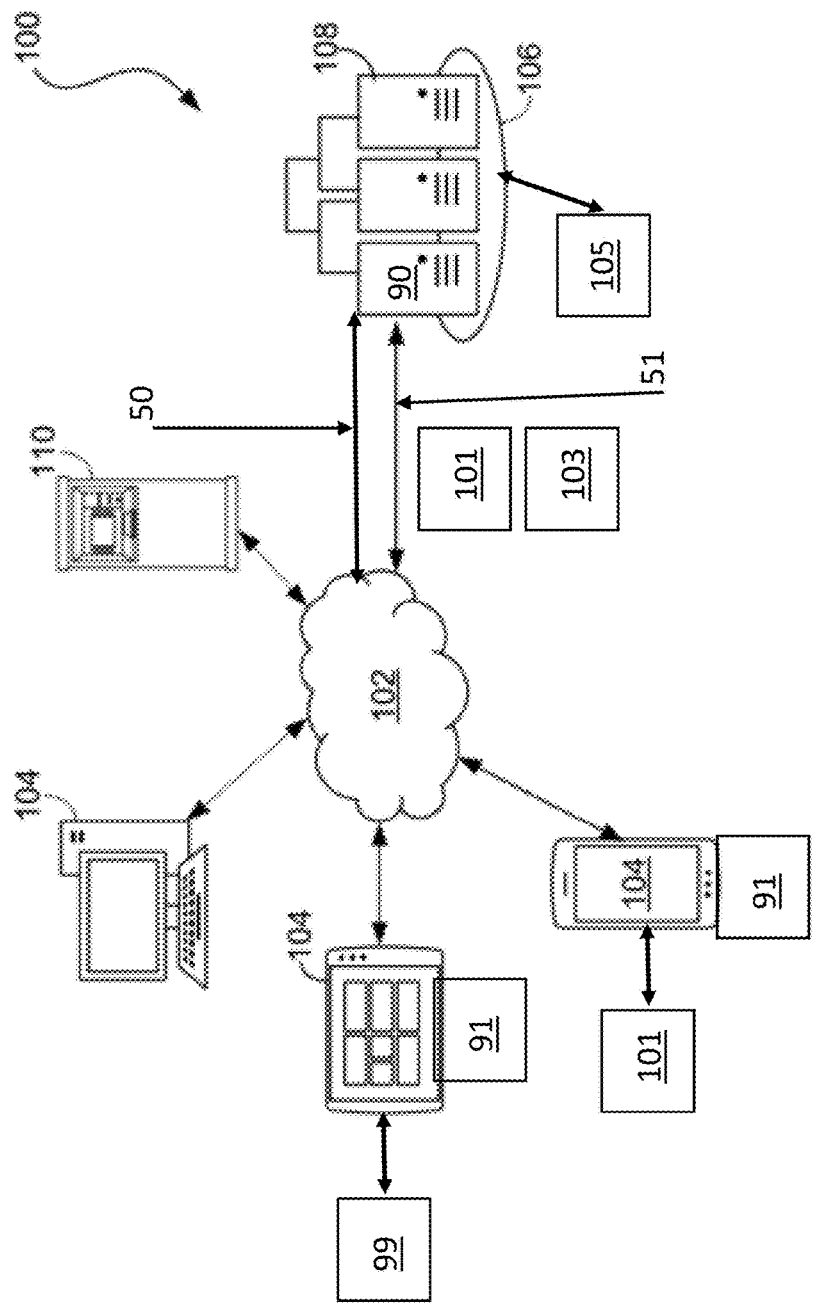
FIG. 1 shows an example system diagram of the networked service for generating and updating a user profile.

Referring now to FIG. 1, there is shown a computer network 100 that comprises an example embodiment of a system for generating and maintaining a user profile 99, 101.

More particularly, the computer network 100 comprises a wide area network 102 such as the Internet to which various user devices 104 (for example a mobile device), an ATM 110, and data center 106 are communicatively coupled. The data center 106 comprises a number of servers 108 networked together to collectively perform various computing functions. For example, in the context of a financial institution such as a bank (one example of an institution), the data center 106 may host online banking services that facilitates users to log in to those servers 108 using user accounts that give them access to various computer-implemented banking services, such as online fund transfers. For example, in the context of a financial institution such as a bank, the data center 106 may host an online profile management service 90 that facilitates users to log in to those servers 108 using user accounts, for example, that give the user access to various computer-implemented user profile functionality, such generation of user profiles 99, 101, as well as access to served content 103 and ability to update their user profile 99, 101. For example, the user profile service 90 can be accessed via the network 102 using a client-server model, e.g. an application 91 executed on the user device 104 that communicates with the user profile service 90 hosted on one or more of the servers 108.

Furthermore, individuals may appear in person at the ATM 110 to withdraw money from bank accounts controlled by the data center 106. The data center 106 can generate the user profile 101 based on a number of criteria, and supply the user profile 101 to the user for presentation on a user interface 212 (see FIG. 2) of the user device 104. As further discussed below, the user, once reviewing the generated user profile 101, can then implement actions based on served content 103, in order to upgrade or otherwise amend their user profile 101. It is recognized that these actions can be used to simulate changes/modifications to the user profile 101 or can be used to actually implement such changes/modifications. In the event of actual implementation of the changes/modifications, content of the updated user profile 101 can be used to also update group profile data 105 (recognizing that the group profile data 105 contains data representative of a plurality of users) used in generating subsequent versions of the user profile 101 as well as for user profiles 99 of other users, as further described below.

Figure 2:
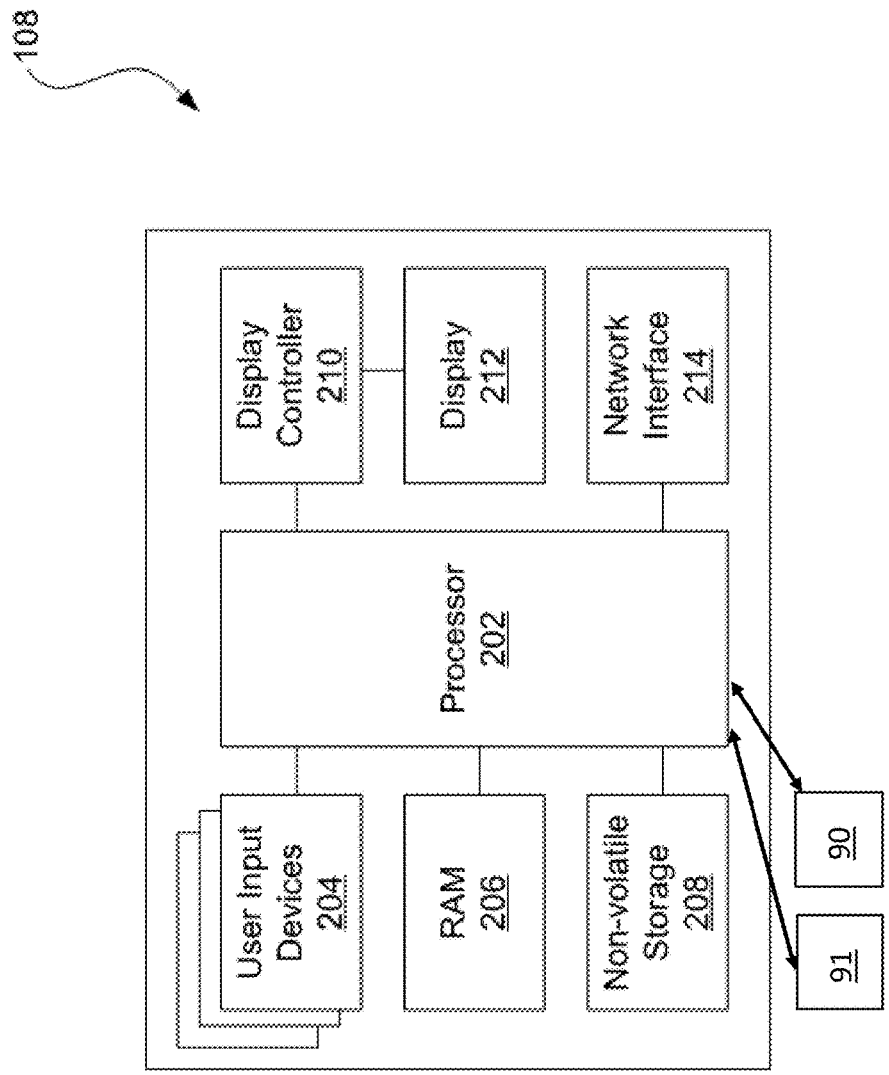
FIG. 2 shows a block diagram of the example computing device of the system of FIG. 1.

Referring now to FIG. 2, there is depicted an example embodiment of one of the servers 108 that comprises the data center 106. The server comprises a processor 202 that controls the server's 108 overall operation. The processor 202 is communicatively coupled to and controls several subsystems. These subsystems comprise user input devices 204, which may comprise, for example, any one or more of a keyboard, mouse, touch screen, voice control; random access memory ("RAM") 206, which stores computer program code (e.g. user profile service 90, user interface embodied as the application 91) for execution at runtime by the processor 202; non-volatile storage 208, which stores the computer program code executed by the RAM 206 at runtime; a display controller 210, which is communicatively coupled to and controls a display 212; and a network interface 214, which facilitates network communications with the wide area network 104 and the other servers 108 in the data center 106. The non-volatile storage 208 has stored on it computer program code that is loaded into the RAM 206 at runtime and that is executable by the processor 202. When the computer program code is executed by the processor 202, the processor 202 causes the server 108 to implement a method for generating the user profile 99, 101, such as is described in more detail in respect of FIG. 4 below. Additionally or alternatively, the servers 108 may collectively perform that method using distributed computing. While the system depicted in FIG. 2 is described specifically in respect of one of the servers 108, analogous versions of the system may also be used for the user devices 104.

Figure 3:
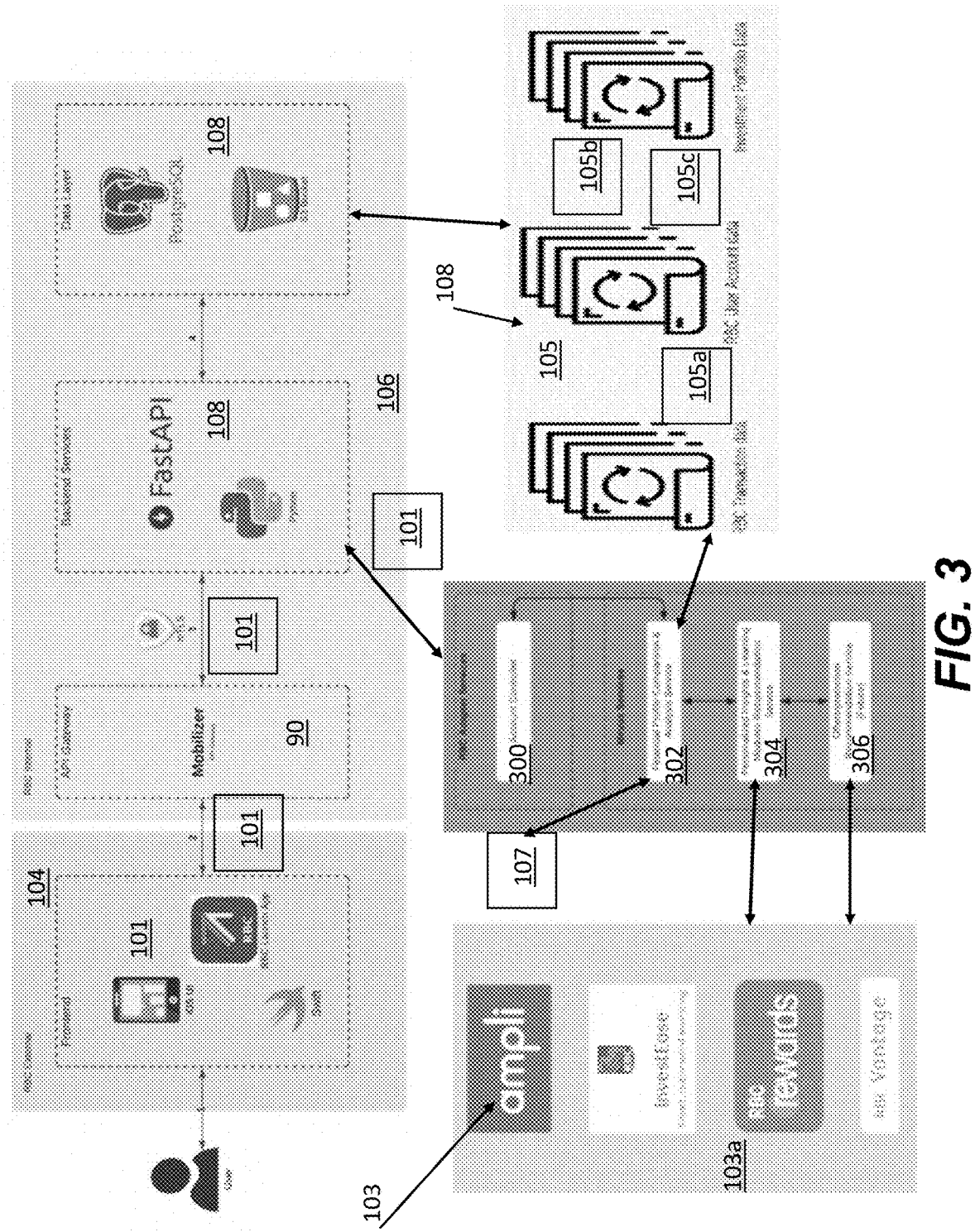
FIG. 3 shows an example configuration of the service of FIG. 1.

Referring to FIG. 3, the service 90 can include a number of modules, including such as but not limited to: a profile generator 300 for generating the user profile 101 suitable for display on the user interface 212; a comparison module 302 for use in comparing user profile data 304 with the group profile data 105; a content generator module 304 used to generate the content 103 for presentation on the user interface 212, such that the content 103 is selected from a plurality of available content in a content store 103a (the content 103 is selected by the module 304 based on the contents of the generated user profile 101); and an offers/promotion service module 306 used to communicate avenues for potential modification and upgrades to the contents of the user profile 101, based on interaction with the user and the content 103 served up by the module 304. For example, the modules 300, 302, 304, 306 can be hosted by one or more of the servers 108. As further described below, the group profile data 105 is an aggregate of all users available to the service 90. Of note, is that the aggregate group user profile data 105 can be subdivided into a number of subgroups 105a, 105b, 105c, etc, such that each of the subgroups is characterized by a set of group criteria 107 (e.g. age, profession, geographical location, institution products selected by the user, etc.). For example, the group profile data 105 can contain all financial data concerning bank accounts, credit card transactions, investment data of an institution for a set of users in a larger geographical region (e.g. North America) for users of all ages (e.g. 10-99 years of age). Therefore, an example subset 105a of the total group profile data 105 could be for selected age bracket (e.g. 18-24, 55-65, etc.), for a selected geographical region (e.g. Toronto), and for a selected profession (e.g. office worker). In this way, the group criteria 107 can be used by one or more of the modules (e.g. the comparison module 302) to select subgroup data 105a of the group profile data 105 by which to compare with the user profile data 101, as further described below. It is recognized that the subgroup data 105a can contain generalizations of the overall data 105a, such as arithmetic averages, ranges, etc.

One embodiment of the service 90 and application 91 operation is as a financial accounts explorer/facilitator/advisor for the user, based on the user profile data 101 and the group profile data 105. For example, the application 91 can be an institution (e.g. RBC) Launch app that is powered by both a recommendation engine (through collaborative filtering—e.g. the comparison module 302) and a data aggregation engine (e.g. the server 108 hosting the group profile data 105 used by the module 300). For example, the group data 105 can be an aggregation of proprietary RBC data representing different RBC products (e.g. bank accounts information, reward points information, investment information, credit card information, etc.). The module 302 can take the existing user profile data 101 (such as already known/stored to the system or otherwise provided to the module 300 in real time during interaction of the user with the service 90) and supply this profile data 101 to the comparison module 302, which can provide comparisons with the selected group profile data 105a,b,c based on group criteria 107 inherent in the user profile 101 (e.g. the user is of age 22, lives in Toronto, and is a software programmer). Once the comparison is completed, then the insights module 304 (i.e. content generator module 304) can provide content 103 for inclusion with the user profile 101 that is sent to the user for display on the user interface 212. Examples of the user profile 101 are provided in FIG. 7, as further described below.

As such, the content 103 is based on the contents of the user profile 101, which itself contains indications/statements of the results of the comparison action performed by the comparison module 304. For example, the user profile 101 could contain comparative information such as but not limited to: User spends 20% more money per month on credit cards as compared to their peers (as provided by the group data 105); user has 10% less savings than their peers; user does not have any investments as compared to 65% of their peers who have at least one investment, etc. Given such comparative content in the user profile 101, the served content 103 could contain such as but not limited to: literature on potential investments available to the user; different available bank accounts or credit cards that would be better suited for their spending habits, etc. As such, the served content 103 could therefore contain actionable insights (e.g. links on how to open an investment account, a link to a budgeting application to help the user reduce their reliance on credit card usage, etc., based on financial habits compared against peers (represented by the group profile data 105).

As such, given the above, it is recognized that the group profile data 105 contains a number of different subgroups 105a,b,c, at least one of which would best match a group profile of the user (e.g. based on a match between the subgroup criteria 107 and the actual criteria of the user). This matching of user to subgroup criteria (e.g. age and stage) can be performed by the generator module 300, as a way to instruct the comparison module which subgroup 105a,b,c best matches the user's situation.

Figure 4:
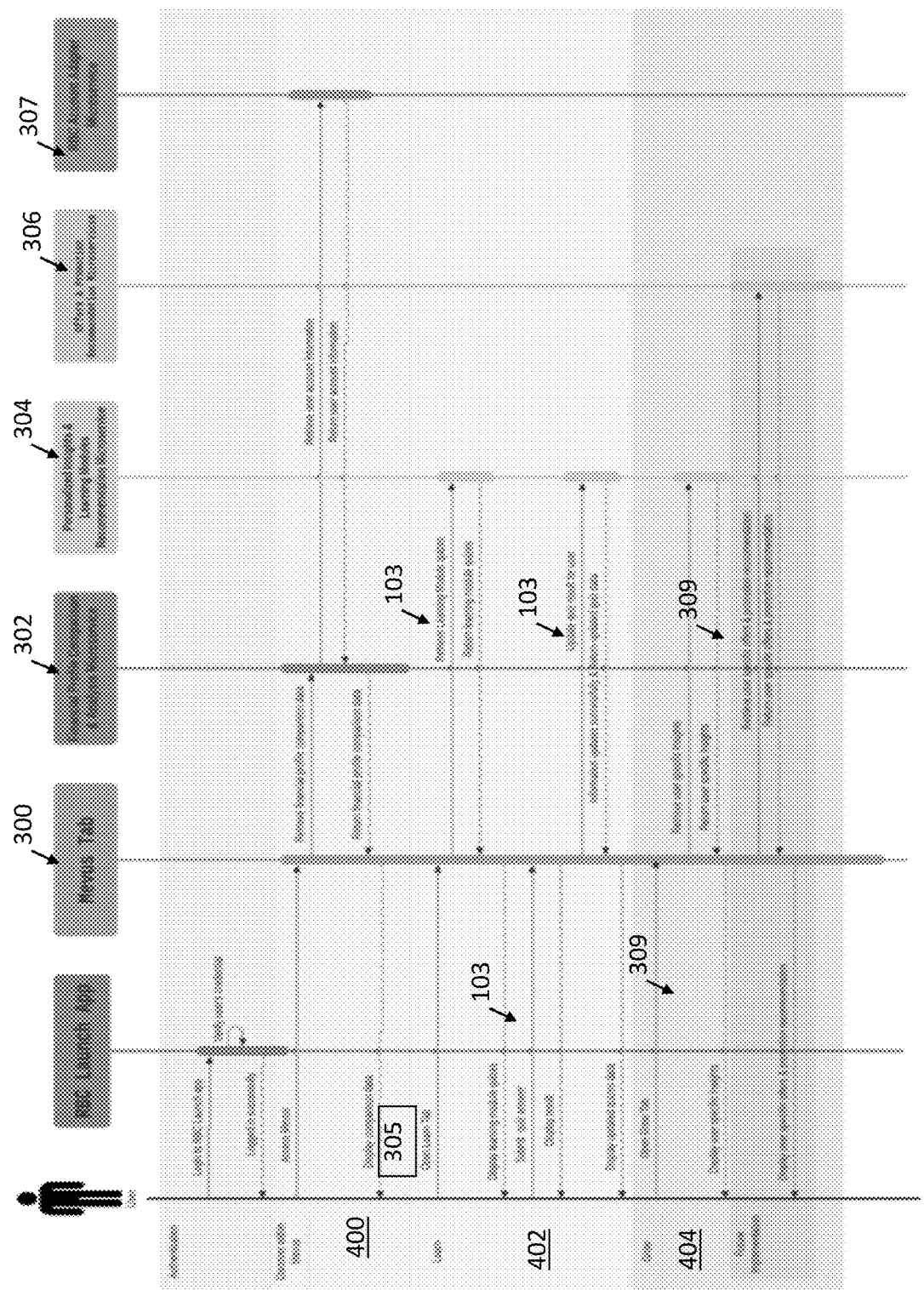
FIG. 4 shows an example process flow of the service of FIG. 3.

Further provided, in reference to FIG. 4, is an embodiment in which the comparison module 304 accesses the user data by way of an institution account module 307 (i.e. a module that is linked to all available stored information about the user in the group profile data 105). As such, it is recognized that any stored institutional data about the user would be resident in the group profile data 105, and as such would be available to be used in the comparison and generation of the user profiles 99 for other users. Further, it is recognised that any user information obtained though interaction with the user in real time with the service 90 can be made available to module 307 and thus stored in the group profile data 105 for subsequent access by the module(s) 300, 302, 307.

Referring again to FIGS. 1 and 4, shown is an example process diagram for the service 90 interacting with the user (e.g. via the application 91). It is noted that there are a number of stages (e.g. 3) of the process interaction, namely by example a discover stage 400, a learn stage 402 and a grow/modify stage 404. The user of the device 104 can access the service 90 by sending a user communication 50 (e.g. a request generated via the application 91 and sent over the network 102 for receipt by the service 90). Alternatively, or in addition to, the service 90 can communicate with the user (of the device 104) using a service communication 51 (e.g. a notification generated via the service 90 and sent over the network 102 for receipt by the application 91).

The first stage of discover 400 is where the user can supply profile information (e.g. age, profession, etc.) to the service 90, or otherwise relies upon the service 90 to access data 101, 103, 105, 107 and thus generate an initial or otherwise updated user profile data 101 (e.g. which can be presented as a user dashboard—see FIG. 7) in consultation with the generation module 300. It is recognized that this first stage 400 can be the result of the user communicating with the service 90 via sending the user communication 50 to the service 90 or by the user receiving a service communication 51 (e.g. being pushed a service generated notification).

Figure 7:
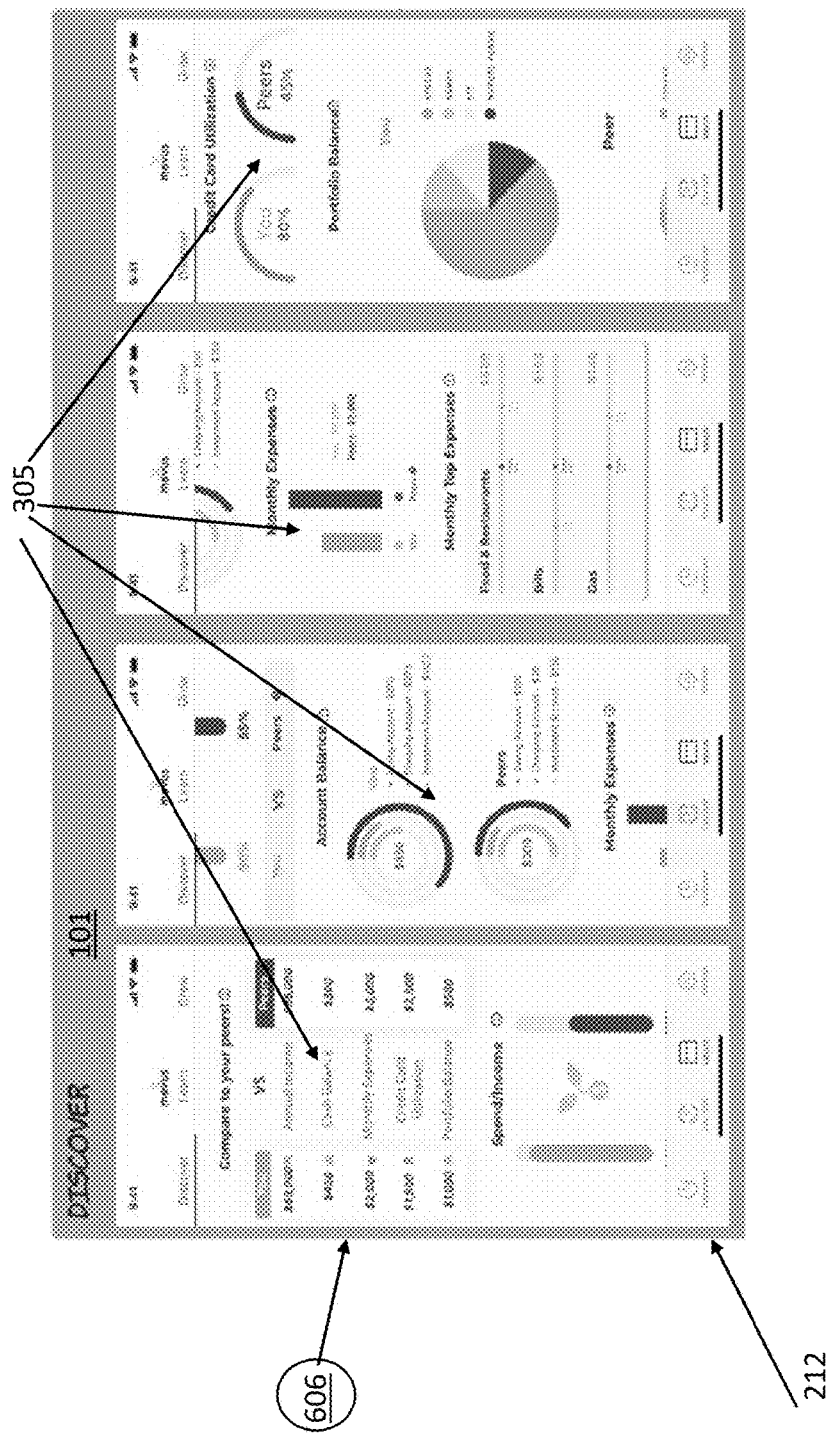
FIG. 7 shows a further example user interface content of the service of FIG. 3.
Figure 8:
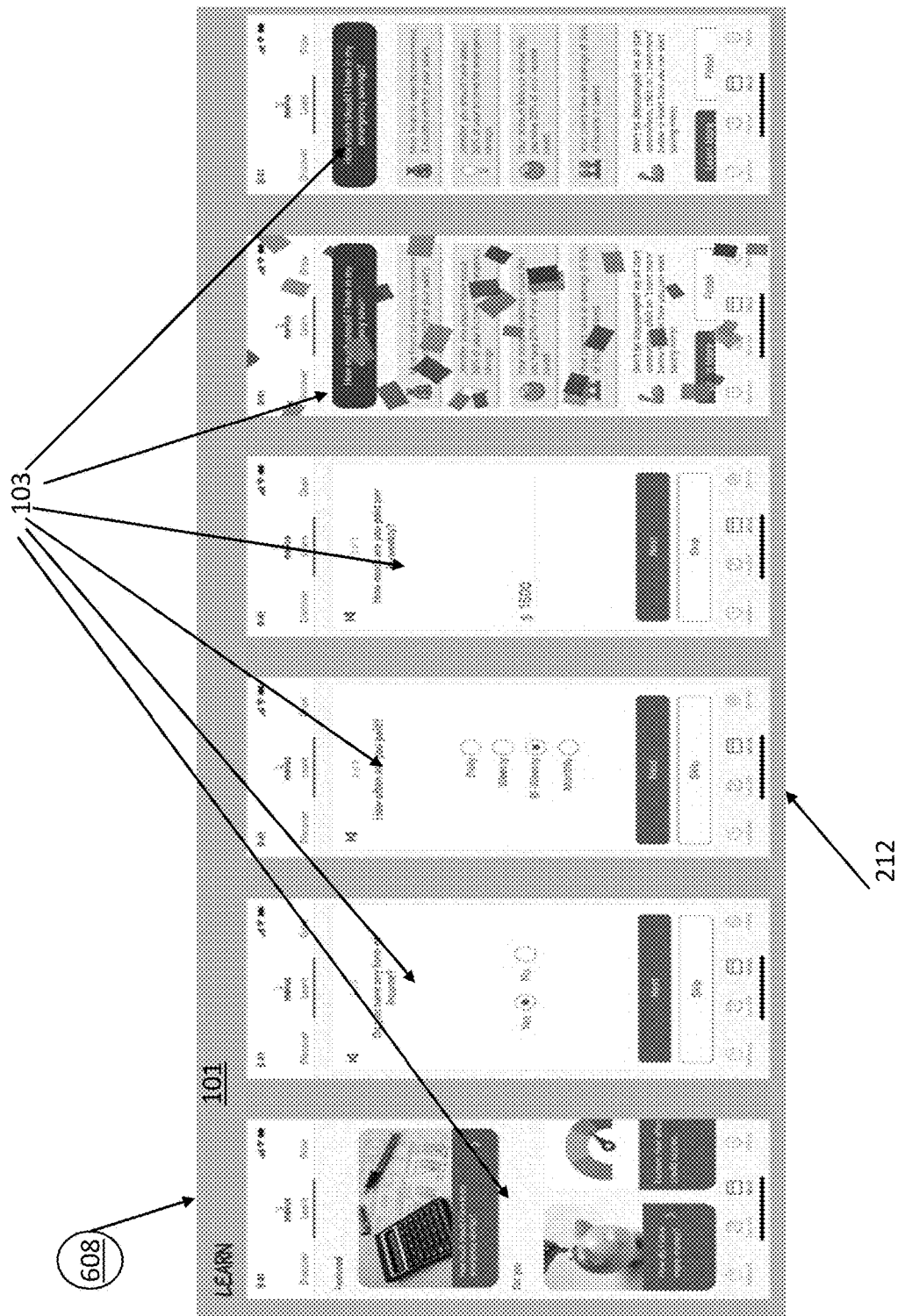
FIG. 8 shows a further example user interface content of the service of FIG. 3.

The second stage or learn stage 402 is where the content module 302 serves up content 103 (e.g. recommended learning content based on comparative data) based on the results of the comparison step (i.e. as represented in the updated/generated user profile 101 by way of comparative information 305—see FIGS. 7,8). It is anticipated that the served content 103 can be included as part of the user profile 101 and or be sent to the user as separate to the comparative data included in the user profile 101. It is recognized that this second stage 402 can be the result of the user communicating with the service 90 via sending the user communication 50 to the service 90 or by the user receiving a service communication 51 (e.g. being pushed a service generated notification).

The third or growth phase 404 (see FIG. 9) can be implemented by the offers module 306, which can be accessed by links 309 resident in the updated user profile 101 sent to the user (e.g. as part of the contents of the served content 103). For example, the links 309 can be an icon or other active network link to a webpage providing instructions on how to sign up for a selected financial product. It is recognized that this third stage 400 can be the result of the user communicating with the service 90 via sending the user communication 50 to the service 90 or by the user receiving a service communication 51 (e.g. being pushed a service generated notification).

Further, in view of the above, the various stages 400, 402, 404 can be implemented iteratively in sequence and/or can be repeated as needed. For example, stage 400 can be followed by stage 402, then by stage 404, then by stage 402 repeated for further learning content 103 (e.g. pushed by the service 90 to the user based on comparison of the group data 105 with the user profile 101—for example in response to updates received to the user profile 101 and/or the group data 105). Based on the updates to the profile 101 (and/or responses of the user to the content 103), the stage 404 can then be repeated. As another example, stage 400 can be requested by the user via user communication 50 and then followed by stage 402, then by stage 404, then by stage 400 repeated for further user profile data 101 needed by the service 90 in response to the actions performed by the user in stage 404. Based on the updates to the profile, the stage 402, 404 can then be repeated.

In view of the above, it is recognized that communication between the user (via the device 104) and the service 90 can be synchronous or asynchronous communications 50, 51, as initiated by the user and/or the service 90.

Figure 5:
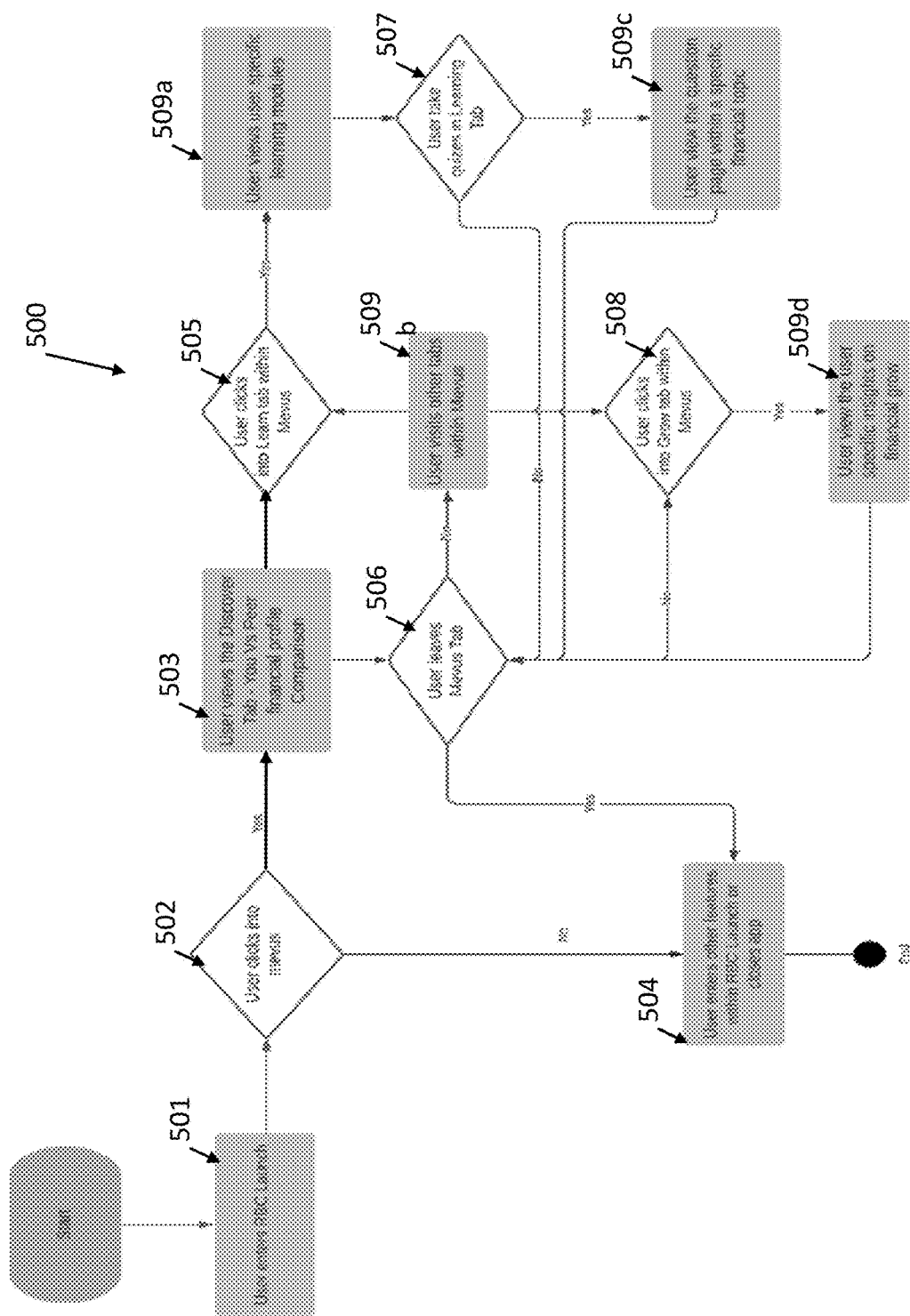
FIG. 5 shows an overview of the process of FIG. 4.

Referring to FIG. 5, shown is an overview method 500 representing an example embodiment of the individual process steps shown in FIG. 4. For example, the user can launch 501 the application 91 and then select 502 various menus for a selected 503, 504 stages 400, 402, 404. Other selections 505, 506, 507, 508 can be done by the user to navigate to various stages 400, 402, 404 of the service 90 doing various stage tasks 509a,b,c,d provided by example.

It is noted that the end results of the stage 404 (e.g. changes to the behavior of credit card usage, signing up for a new institution product such as a savings account, etc.) can be used to update the content of the user profile 101, as well as to update the overall content of the group profile data 105

(representing a plurality of users, each also progressing through the stages 400, 402, 404) based on the interactions of the plurality of users with the service. As such, it is recognized that the content of the group profile data 15 will evolve over time, as will the content of the individual user profiles 99, 101. It is recognised that the module 307 can be responsible for storing the changes to the user profile data 101 as well as the group profile data 105 stored in the storage of the service 90, e.g. storage 206, 208.

In view of the above, it is recognised that the interaction 50, 51 described between the service 90 and the application 91 can be used to advantageously compare a user's financial profile data (included as part of the contents of the user profile data 101) to that of their peers (of similar income, age group, location etc. as represented by the subgroup data 105a,b,c selected) and the resulting generated user profile data 101 (e.g. financial dashboard) can provides novel and personalized insights & recommendations (as served using the served content 103) based on the specific user's financial habits (e.g. as exemplified by the comparative data 305 contained in the user profile data 101 as generated by the comparison module 304). It is appreciated that the service 90—application 91 interaction 50, 51 via the network 102, in reliance upon the group profile data 105, can spark user financial curiosity through social benchmarks (of the group profile data 105), data-driven insights (of the comparative data 305), providing actionable advice (of the served content 103 and/or the links 309) to help clients of the institution thrive. For example, as an example institution being a financial institution, the client/user could be a young professional or a person nearing retirement, each having their own relative distinctive subgroup 105a,b,c.

For example, the interaction 50, 51 described between the service 90 and the application 91 can be for institutional clients (new or already existing) aged 18-24 who need support with their personal finance management and education, such that provided via the client-server interaction 50, 51 is a mobile advisor that can provide actionable & reliable advice. Unlike other existing prior art money management apps, the interaction 50, 51 described between the service 90 and the application 91 is powered by real client data (as accessible by the module 300, 307), so one can rely on it to provide relevant advice even as the financial profile 101 evolves.

In this manner, it is recognized that user profile 101 will be regenerate periodically, in order to take advantage of changes/updates to the personal data of the user through the growth of their user profile content (e.g. as obtained via execution of stage 404) and any updates to the content of the group profile data 105 (as performed by the module 307) for all changes to the user profiles 101 content over time, as well as the addition of new users registered with the service 90 and therefore the institution itself (e.g. the bank). For example, the information content presented 50, 51 in the user profile 101 can be dynamically generated, for example dynamic such as in ever-changing based on any changes or updates to the peer group data 105 (or selected portions thereof) and or the user data (or selected portions thereof). With ever-changing data like expenses, for example, the user could be sent new content in an updated user profile 101 every time they log in. The advantage of update user profile 101 content can be in making every user visit 50, 51 to the service 90 more insightful.

For example, the modules 300, 302, 304 working in conjunction with one another can perform as a representative recommendation engine, which acts on data pulled from the database (e.g. data 105 and any user content stored therein) and thereby generates the served content 103. It is recognize that the served content 103 is personalized based on the contents of the comparative data 305 resident in the generated user profile 101.

Referring again to FIG. 4, an example Discover phase 400 can be the Peer comparison (data 305) facilitating users to see how they compare to their peers for different financial aspects (account balances, credit, transactions, investments). An example Learn: phase 402 is where users receive personalized insights 103 for the pain points of their financial health, how much the difference is between them and their peers, and what financial goal they should work towards. An example of the Grow phase 404 is users receive 50, 51 personalized recommendations for how they can improve their financial health 103, and what actions 309 they can take (e.g. opening new accounts, negotiating utility bills, shopping at cheaper stores, investing into mutual/index funds, using other RBC products/points).

Further, in terms of the stored data 105 and any user data collected in real time, the service 90 utilizes data from different institution data sources (e.g. channels) and calculates aggregates data 105 of that data for all users available to the institution, such that a subgroup 105a,b,c is selected based on the group criteria 107 for the user to compare against. The service 90 utilizes the differences between the user's and the aggregate financial information (e.g. the comparative data 305) and triggers pre-stored insights (e.g. served content 103) for the (e.g. ranked highest priority) financial health points that the user needs to work on be become more similar to their peers group over time. It is also recognized that the peer group (e.g. subgroups 105a,b,c) can also change for the user, as the user ages or otherwise changes some other of their group criteria (e.g. moves cities, changes job, etc.). Further, the service 90 can utilizes pre-stored actionable recommendations (e.g. links 309 based on the served content 103) that are triggered 51 based on which priority financial health points are shown to the use (i.e. in the generated user profile 101 such as by the comparative content 305). These recommendations 309 can be accessed 50, 51 by touching/swiping into the grow stage 404 of the application 91—service 90 interaction, or they can be directly clicked into through a button provided within the insight content 103.

Examples of the user profile 101, the served content 103, the comparative data 305 and the links 309 can be as follows. The service 90 compares user's financial profile 101 and the aggregated data (105a,b,c) of their selected peer group, generates user specific insights (served content 103) and recommended actions (indicated links/actions 309) for the user via the user interface 212. For example, if the user savings account balance is higher than 50% (provided as data 305 in the generated user profile 101), the service 90 can send via communications 50, 51 the user the following insights data 103:

"Well done, you are doing a good job saving, you may want to consider opening an investment account. Investment is one of many ways to grow your money, however, before going into investing, it is important to:

Pay off large high interest debt e.g. credit cards. Build emergency savings. Assess your level of comfort with taking on risk".

In turn, the insights module 304 can be rule based, such that based on the contents of the user profile 101 (e.g. the comparative data 305), the module 304 can act as a sort of a recommendation engine using a insight pattern template. For example, one rule template can be If A (account balance OR spend OR investments data 101) is B % more/less than C (peers OR financially healthy amount as data 305), then show X learning insights (notification data 103) which take (button) the user to Y actionable advice, and gives them the option (buttons as links 309) to utilize Z (new account, RBC products, RBC points, coupons/promotions, mutual/index funds, etc.).

Further to the above, the exact user vs peer comparisons (providing the comparative data 305) in the Discover phase 400 can be by example such as but not limited to the following, including optional manual input by the user:
  Annual income
  Account balances (Chequing account, Savings account, Investment account)
  Monthly expenses
  Credit balance
  Credit utilization
  Investment portfolio balance
  Monthly top expenses (Ie, food & restaurant, utilities, transportation)

In the Learn phase 402, the served content 103 can be embodied as a quiz/learning module that will help the user better understand their account balance and the amount they need in their emergency savings. After receiving the users' answers to the served content 103, the service 90 (any of the modules 300,302,304,306) can perform some calculations to find a number of recommendations/options (data 309) for the user to take. The recommendation engine can be an embodiment of the part of the service 90 doing these calculations with pre-built logic tta is rule based. In other words, the user profile 101 is generated based on the comparison of the user data with the group profile data 105*a,b,c*. The generated user profile 101 would contain the comparative data 305, for example. The contents of the comparative data 305, as well as any other data resident in the user profile 101 (e.g. users age), can be used via communications 50, 51 to direct which of the served content 103 should be included and sent back to the user (e.g. inside or outside of the actual user profile data 101 as rendered in the user interface 212).

The same recommendation engine (or other engine as desired) can the give more recommendations links 309 in the Grow phase 404, based on the served content 103 interacted with or otherwise selected 50, 51 by the user via the application 91. By analyzing the user's financial situation and cross referencing the data to the financial logic of the service 90, the recommendation engine can send out options 309 that the user can take. These call to actions 309 are advantageous in that the service 90 is not only taking user data and performing calculations, we is also giving more than just insights 103, as it is also giving actionable advice 309 that users can utilize to adjust/amend or otherwise update their user profile data 101.

Figure 6:
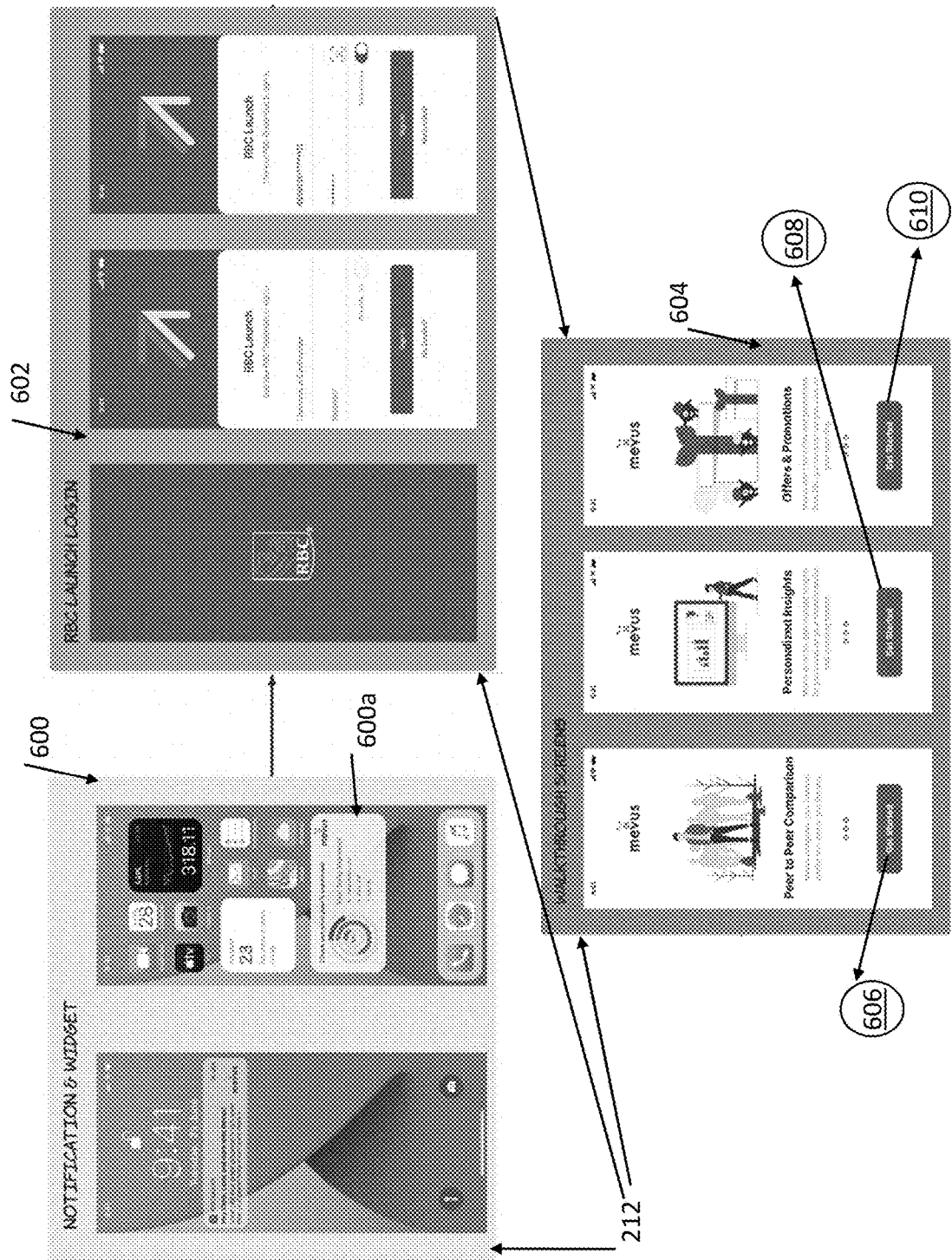
FIG. 6 shows example user interface content of the service of FIG. 3.

Referring to FIG. 6, shown is an example user interface 212 workflow, having a launch application screen 600 with notification 600*a* example, subsequent a login screen 602 and a subsequent homepage 604 having a launch point 606 for the discovery phase 400, a launch point 608 for the learn phase 402 and a launch point 610 for the grow phase 404.

Other options as performed by any of the modules 300, 302,304,306 in any of the stages 400, 402, 404 can be as follows using communications 50, 51: Users have the option of turning the comparison on or on, such that when comparison is off, user can still have holistic view of all their assets & liabilities from every financial institution in the generated user profile 101; Users can view comparisons outside their own peer group to see how others are doing; Users can set financial management goals as part of the user data collected during or after the phase 400 for saving, investment, reducing expenses and earn rewards for meeting and/or working towards those goals; Users can view projections as generated in the user profile 101 of their future financial state based on their current habits and compare it against a different portion of the projection based on the "ideal" or otherwise suggested habits as provided by any of the modules 300, 302, 304, 306; and Users can apply filters on the peer group that they are being compared with, and as such then the users can restrict certain types or categories of information being compared and thus displayed in the user profile 101. Further, comparisons may include insights into what the client doesn't have—i.e. "they may not own a car but everyone in their peer group does" or "peer group has child care expenses". Understanding the costs of other life decisions.

Referring to FIG. 10, shown is an example operation 700 of the system 10 (of FIG. 1) for generating a user profile 101 based on a comparison to peer group data 105, the user being a member of an institution. For example, obtaining 702 the user profile data pertaining to a user of a network service 90 of the institution; accessing 704 group profile data 105 associated with the user; comparing 706 the user profile data to the group profile data 105 to generate comparative data; generating 708 a user profile 101 for presentation on a user interface 102, the user profile including the comparative data; sending 710 the user profile 101 to the user; receiving 712 a request 50, 51 from the user for a product of the institution; and updating 714 contents of the user profile 101 to include information pertaining to the product. It is also recognised that the step of updating can be used to update the group profile data 105 based on the contents (e.g. updates) to the user profile 101. In this manner all updates to the profiles 99, 101 can be used to update the group peer data 105.

Figure 9:
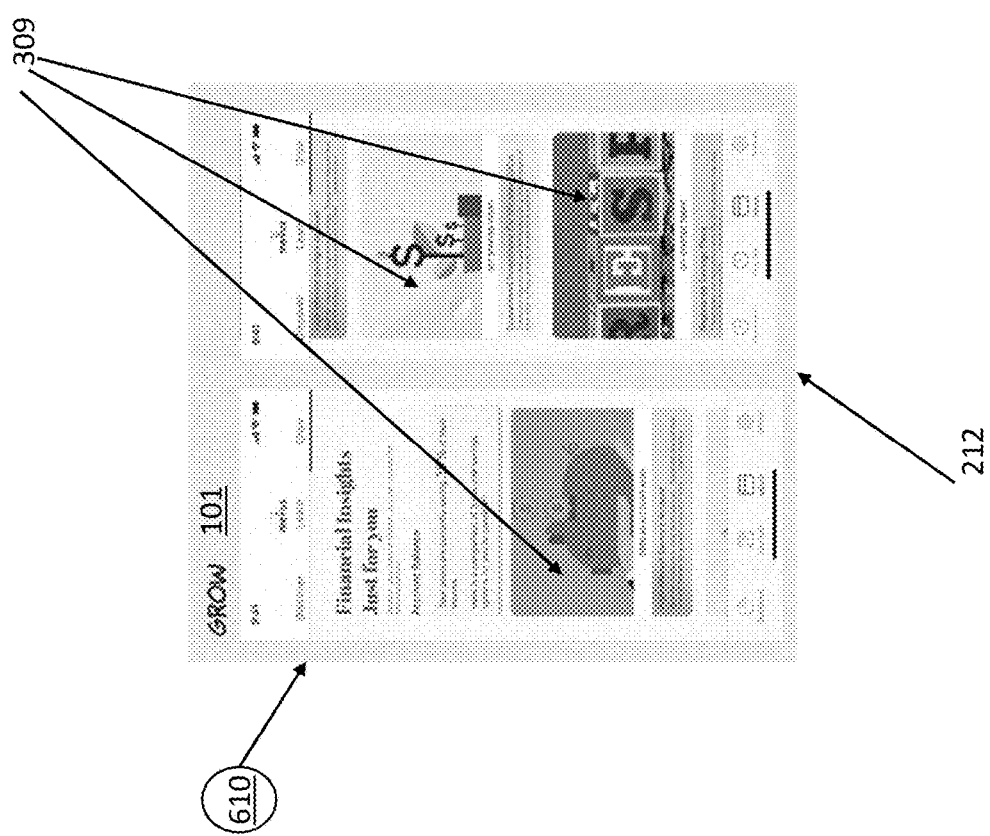
FIG. 9 shows a further example user interface content of the service of FIG. 3.

Referring to FIG. 7, shown are example user interfaces 212 detailing example user profile 101 generated by the generator module 300, based on the comparison performed by the module comparison 302 (see FIG. 4). The user profiles 101 include the comparative data 305 generated by the comparison module 302. Referring to FIG. 8, shown are further examples of generated user profiles 101 including the served content 103. Referring to FIG. 9, shown are further examples of generated user profiles 101 including the links content 309. It is recognized that the generated content displayed on the user interface 212 for stages 402 and 404 may contain comparative data 305 or may not, depending upon the functionality chosen for interaction between the application 91 and the service 90. It is also recognized that the generated content displayed on the user interface 212 for stage 404 may be considered as non-user generated profile 101 information, rather simply display content provided to the user via other parts of the Institution's website, as accessed via the links 309, for example.

Given the above, an advantage to the described service 90 and associated application 91 is that analysis of a user financial profile 101 can be provided, including a comparison to "peers" 105 and thus serve to the user financial content 103 that the user needs. Because it's based off of peer group data 105 that can share similar financial situations with the user, the user can consider the generated user profile 101 as relatable, as it also gives reason (e.g. comparative data 305) behind insights (e.g. served content 103). When a financial advisor recommends you to get a TFSA versus your coworker who earns relatively the same amount of you, who would be inclined to listen to more?

As such, the described service 90 and application 91 facilitates serving financial content 103 in or otherwise associated or based off of the user profile 101, such content 305, 103 that is recommended or otherwise provided by financial advisors who have expert knowledge. It is recognised that the peer group data 105 can be used as bench mark data for the comparison as performed above.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method for generating and updating an individual user profile by a network service based on a comparison to group profile data, the method comprising the steps of:

obtaining, by the network service, the group profile data provided as benchmark data and subdivided into a plurality of subgroups, such that each of the subgroups is characterized by a set of group criteria;

obtaining individual user profile data pertaining to a specific user of the network service of the institution, the specific user associated with the individual user profile being a member of an institution, the individual user profile based on individual user profile data communicated on a communications network between a user device and a network service device;

performing a matching between the set of group criteria of each of the plurality of subgroups and actual criteria of the specific user to identify one of the plurality of subgroups as a representative subgroup associated with the specific user;

accessing the representative subgroup associated with the specific user;

comparing the individual user profile data to the representative subgroup to generate comparative data;

generating the individual user profile for presentation on a graphical user interface of the user device, the individual user profile including the comparative data provided as served content specific to the specific user from the network service, the served content including one or more actionable links associated with one or more products of the institution, the one or more actionable links selected from a plurality of prestored actionable recommendations, the one or more actionable links personalized by the network service for the specific user;

displaying, on the graphical user interface of the user device, a presentation of the comparative data and the one or more actionable links, the one or more actionable links comprising user-selectable graphical options, the presentation visually indicating differences between the individual user profile data and the benchmark data for the representative subgroup;

sending the served content to the user device by the network service device over the communications network;

receiving a request by the network service device from the user device for a product of the one or more products, the request generated by implementation of the one or more actionable links by the specific user in operating the graphical user interface, the implementation including the specific user selecting one of the one or more actionable links on the graphical user interface; and updating, in real-time, contents of the individual user profile to include information pertaining to the product based on the resultant implementation of the one or more actionable links that reflects user interaction with the one or more actionable links by the specific user;

updating the representative subgroup in the group profile data using said information and said resultant implementation in order to provide updated group profile data;

dynamically updating, in response to the updated group profile data, contents of a second individual user profile of the institution using the updated group profile data, the second individual user profile associated with a second specific user; and updating, in real-time, a presentation on a graphical user interface of a second user device visually indicating differences between second individual user profile data and the benchmark data for the updated representative subgroup;

wherein the one or more actionable links are provided as an active network link to a webpage associated with the institution.

2. The method of claim 1, wherein said obtaining of the individual user profile data is by way of a user generated communication directed to the network service over the communications network.

3. The method of claim 1, wherein said obtaining of the individual user profile data is by way of a network service generated communication previously directed to the specific user over the communications network.

4. The method of claim 1, wherein said receiving the request is by way of a user generated communication directed to the network service over the communications network.

5. The method of claim 1, wherein said receiving the request is in response to a network service generated communication previously directed to the specific user over the communications network.

6. The method of claim 1, wherein the product information is content for presentation on the graphical user interface of the user device, such that the content is selected from a plurality of available content stored in a content store.

7. The method of claim 6 further comprising selecting the content from the content store based on the contents of the individual user profile.

8. The method of claim 1, wherein the group profile data is an aggregate of all users available to the network service.

9. The method of claim 8 further comprising updating the group profile data using at least a portion of the contents of the individual user profile.

10. The method of claim 1, wherein the presentation on the graphical user interface of the user device and the presentation on the graphical user interface of the second user device comprise at least one of: a bar chart, a pie chart, a circular chart, a side-by-side numerical comparison, or a categorized horizontal bar display.

11. A system for generating and updating an individual user profile by a network service based on a comparison to group profile data, the system comprising stored instructions for execution by a computer processor for:

obtaining, by the network service, the group profile data provided as benchmark data and subdivided into a plurality of subgroups, such that each of the subgroups is characterized by a set of group criteria;

obtaining individual user profile data pertaining to a specific user of the network service of the institution, the specific user associated with the individual user profile being a member of an institution, the individual user profile based on individual user profile data communicated on a communications network between a user device and a network service device;

performing a matching between the set of group criteria of each of the plurality of subgroups and actual criteria of the specific user to identify one of the plurality of subgroups as a representative subgroup associated with the specific user;

accessing the representative subgroup associated with the specific user;

comparing the individual user profile data to the representative subgroup to generate comparative data;

generating the individual user profile for presentation on a graphical user interface of the user device, the individual user profile including the comparative data provided as served content specific to the specific user from the network service, the served content including one or more actionable links associated with one or more products of the institution, the one or more actionable links selected from a plurality of prestored actionable recommendations, the one or more actionable links personalized by the network service for the specific user;

displaying, on the graphical user interface of the user device, a presentation of the comparative data and the one or more actionable links, the one or more actionable links comprising user-selectable graphical options, the presentation visually indicating differences between the individual user profile data and the benchmark data for the representative subgroup;

sending the served content to the user device by the network service device over the communications network;

receiving a request by the network service device from the user device for a product of the one or more products, the request generated by implementation of the one or more actionable links by the specific user in operating the graphical user interface, the implementation including the specific user selecting one of the one or more actionable links on the graphical user interface; and updating, in real-time, contents of the individual user profile to include information pertaining to the product based on the resultant implementation of the one or more actionable links that reflects user interaction with the one or more actionable links by the specific user;

updating the representative subgroup in the group profile data using said information and said resultant implementation in order to provide updated group profile data;

dynamically updating, in response to the updated group profile data, contents of a second individual user profile of the institution using the updated group profile data, the second individual user profile associated with a second specific user; and updating, in real-time, a presentation on a graphical user interface of a second user device visually indicating differences between second individual user profile data and the benchmark data for the updated representative subgroup;

wherein the one or more actionable links are provided as an active network link to a webpage associated with the institution.

12. The system of claim 11, wherein said obtaining of the individual user profile data is by way of a user generated communication directed to the network service over the communications network.

13. The system of claim 11, wherein said obtaining of the individual user profile data is by way of a network service generated communication previously directed to the specific user over the communications network.

14. The system of claim 11, wherein said receiving the request is by way of a user generated communication directed to the network service over the communications network.

15. The system of claim 11, wherein said receiving the request is in response to a network service generated communication previously directed to the specific user over the communications network.

16. The system of claim 11, wherein the product information is content for presentation on the graphical user interface of a user device, such that the content is selected from a plurality of available content stored in a content store.

17. The system of claim 16 further comprising selecting the content from the content store based on the contents of the individual user profile.

18. The system of claim 11, wherein the group profile data is an aggregate of all users available to the network service.

19. The system of claim 18 further comprising updating the group profile data using at least a portion of the contents of the individual user profile.

20. The system of claim 11, wherein the presentation on the graphical user interface of the user device and the presentation on the graphical user interface of the second user device comprise at least one of: a bar chart, a pie chart, a circular chart, a side-by-side numerical comparison, or a categorized horizontal bar display.

* * * * *